Aug. 3, 1937.  G. C. LAMB  2,088,656
PNEUMATIC TIRE VALVE
Filed April 20, 1936
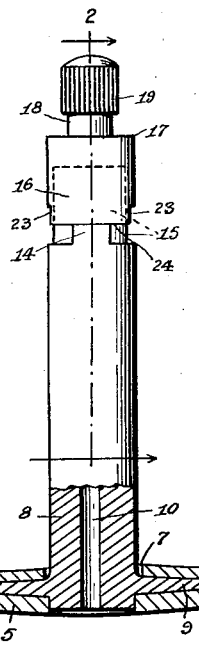
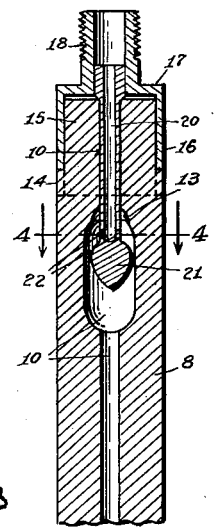
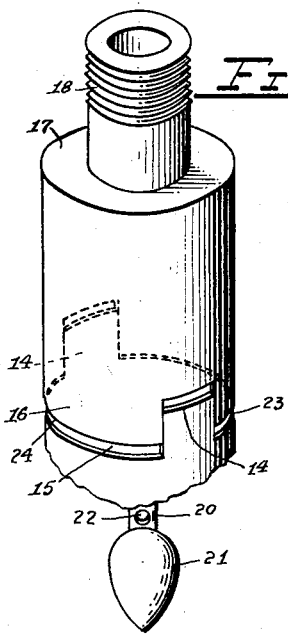
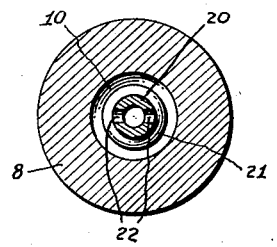
Inventor
George C. Lamb.
By John W. Maupin.
Attorney Patented Aug. 3, 1937

2,088,656

UNITED STATES PATENT OFFICE 2,088,656

PNEUMATIC TIRE VALVE

George C. Lamb, San Diego, Calif.

Application April 20, 1936, Serial No. 75,410

2 Claims. (Cl. 152—12)

My present application relates to pneumatic tire valves and is a continuation in part of my co-pending application, Serial No. 754,574, filed November 24, 1934, entitled "Pneumatic tire valve and stem."

Certain objects of this invention are to provide a tire valve comprising a stem having a bore therethrough with a resilient valve seat and an exterior shoulder or shoulders, and also a valve cap member having a valve head connected thereto by means of a spindle, and said valve cap member being slidably mounted on the valve stem so that said valve cap may be manually lifted to draw the head into the seat, and turned to a locked position against the exterior shoulder or shoulders.

Further objects are to provide a tire valve cap member made in a single detachable metal unit, thus eliminating the use of springs and other delicate parts, and furnishing a valve that is very simple and durable in construction, positive and efficient in operation, and comparatively inexpensive to manufacture.

Other objects are to provide a tire valve which will not deteriorate or get out of order, which will retain air pressure intact over a long period of time, and whose one-piece metal valve cap member will be detached upon contact with the tire rim hole in cases of punctures or blowouts, and thus prevented from being drawn into the tire and doing damage to its inner tube.

In the drawing:

Figure 1 is a view in side elevation of a tire valve embodying the features of the invention, and showing a portion broken away at its tube connection;

Fig. 2 is a view in longitudinal section taken substantially on a broken line 2—2 of Fig. 1, and showing the valve in the sealed position;

Fig. 3 is a corresponding view showing the valve in the unseated position;

Fig. 4 is a view in transverse section taken on a broken line 4—4 of Fig. 3; and Fig. 5 is a detail view in perspective of the one-piece valve cap member seated on a fragmentary portion of the valve stem.

Referring in detail to the drawing wherein like reference numerals designate corresponding parts in the several views, the numeral 5 indicates an inner tire tube mounted in a rim 6 having a hole 7 therethrough. The numeral 8 designates the valve stem which is preferably, though not necessarily, made of rubber and having a base flange 9 which is cemented or otherwise connected to the inner tube. A bore 10 extends from a communication with the inner tube 5 throughout the full length of the stem 8.

The bore 10 through the stem 8 is provided with a resilient valve seat 13. The outer end portion of said stem is provided with one or more exterior shoulders 14. These shoulders are formed by reducing the upper portion of the stem, as at 15, and leaving the shoulders flush with the outer cylindrical surface of the stem, it being understood that said reduced portion extends considerably above or beyond the shoulders.

The reduced portion 15 of the stem 8 is adapted to slidably and snugly receive the skirt portion 16 of a hollow metal valve cap member designated as a whole by the numeral 17. The outer portion of said cap member terminates in a reduced threaded hollow neck 18 which receives a dust cap 19, and which also threadedly receives the discharge end of an inflating tube, not shown. A valve spindle 20 depends centrally from the neck and terminates in a valve head 21. As shown in Figs. 2 and 3, this valve spindle may be hollow and integrally or fixedly connected to the hollow neck 18. Ports or perforations 22 extend through the hollow spindle close to the valve head 21 for the passage of air, it being understood that the hollow stem is in communication with the hollow neck 18.

To install the valve cap member 17 on the stem 8, its valve head 21 is forced through the bore 10 to a point below the valve seat 13. In the installed position, the spindle 20 fits slidably and snugly within the bore 10, and the skirt 16 fits snugly and slidably around the reduced stem portion 15. The skirt 16 is provided with a recess or recesses 23 which are arranged to receive the shoulders 14 formed on the stem, and for clearness, the edge portions of the skirt between said recesses are designated by the numeral 24.

Referring to Figs. 3 and 5 of the drawing, wherein the valve head 21 is in the unseated or open position, in order to seal and close the valve it is merely necessary to raise the valve cap member 17 until its head 21 is securely jammed into the resilient valve seat 13. In this position, the edge portions 24 of the skirt 16 are even with or slightly above the top edges of the shoulders 14, and to lock the valve in this position it is only necessary to turn the valve cap member in either direction to bring the skirt edges 24 to bear against the top edges of the shoulders 14. It being remembered that the valve seat 13 is resilient, sufficient tension is thereby created to hold the skirt edges in secure frictional engagement against the shoulders.

In actual usage it has been found that a valve made in accordance with the foregoing description holds air pressure over a period of months with no appreciable leakage. On the other hand, it is well known that, in the use of valves depending on springs to retain them in the closed position, it is necessary to re-inflate the tires very frequently for the reason that the springs are comparatively weak, and the air pressure of the inner tube is largely depended upon to retain the valves in the closed position. When the air pressure becomes reduced to a certain point the springs no longer function properly or completely, and the tires are rapidly deflated, particularly in passing over bumps and other rough spots in the road.

In order to deflate an inner tube equipped with a valve made in accordance with my foregoing description, it is, of course, only necessary to turn the valve cap member 17 until its recesses 23 register with the shoulders 14 on the stem, and to then force the valve cap member slidably down to the position shown in Fig. 5. In this position the valve head 21 is unseated, as shown in Fig. 3, and the air will be discharged through the bore 10, ports 22, hollow spindle 20 and through the hollow neck 18.

An important feature of my invention is that, in case of sudden deflation of the inner tube caused by a puncture or blowout, the entire metal valve cap member 17 will be jerked off of the rubber stem 8, thus leaving no metal parts to be drawn into the tire where they would do damage to the inner tube. When the valve is drawn into the hole 7 of the rim 6, as is often the case in sudden rupture and deflation, the metal cap member, upon violently engaging the edge of the rim hole at an angle, will be completely detached or pulled off of the stem, and this cap member, being one connected unit and the only metal part of the valve, will leave only the rubber stem to be drawn into the tire. This is, insofar as I am aware, a novel feature not anticipated by other pneumatic tire valves, and is only accomplished by making the metal parts in a single connected unit.

I claim:

1. A pneumatic tire valve comprising a flexible stem having a bore therethrough, a resilient valve seat formed within said bore, a metal valve cap member having a skirt slidably mounted on said stem end portion and an opening communicating with the bore through the stem, a hollow spindle depending centrally from the cap member and communicating with its said opening, said spindle extending slidably and snugly into the bore to a point beyond the valve seat, and a valve head formed on the end of the spindle and arranged to contact with the seat, said hollow spindle having holes therethrough close to the valve head, wherein the flexible stem has exterior shoulders formed on an end portion and the skirt of said cap member has recesses adapted to receive the exterior shoulders on the stem whereby the valve cap may be lowered to unseat the valve head, and said skirt has depending edge portions between its recesses arranged to be brought to bear against the tops of the shoulders when the cap member is raised and the valve is thereby brought into forced engagement with the resilient valve seat.

2. The combination with a pneumatic tire valve comprising a stem having a bore therethrough and a resilient valve seat formed within the bore, of shoulders formed on the upper exterior end portion of said stem, a valve cap mounted on said upper end portion of the stem, a valve spindle depending centrally and fixedly from the cap through the stem bore to a point below the valve seat, a valve head formed on the depending end of the spindle, a skirt depending from the valve cap and slidably disposed on the said upper end portion of the stem, the lower edge of said skirt resting against the shoulders on the exterior portion of the stem when the valve cap is raised to bring its valve head into closed engagement with the resilient valve seat, and said skirt having recesses in its lower edge portion that register with and receive the shoulders on the stem when the valve cap is turned and lowered to disengage its valve head from the resilient valve seat.

GEORGE C. LAMB.